United States Patent Office 3,380,894
Patented Apr. 30, 1968

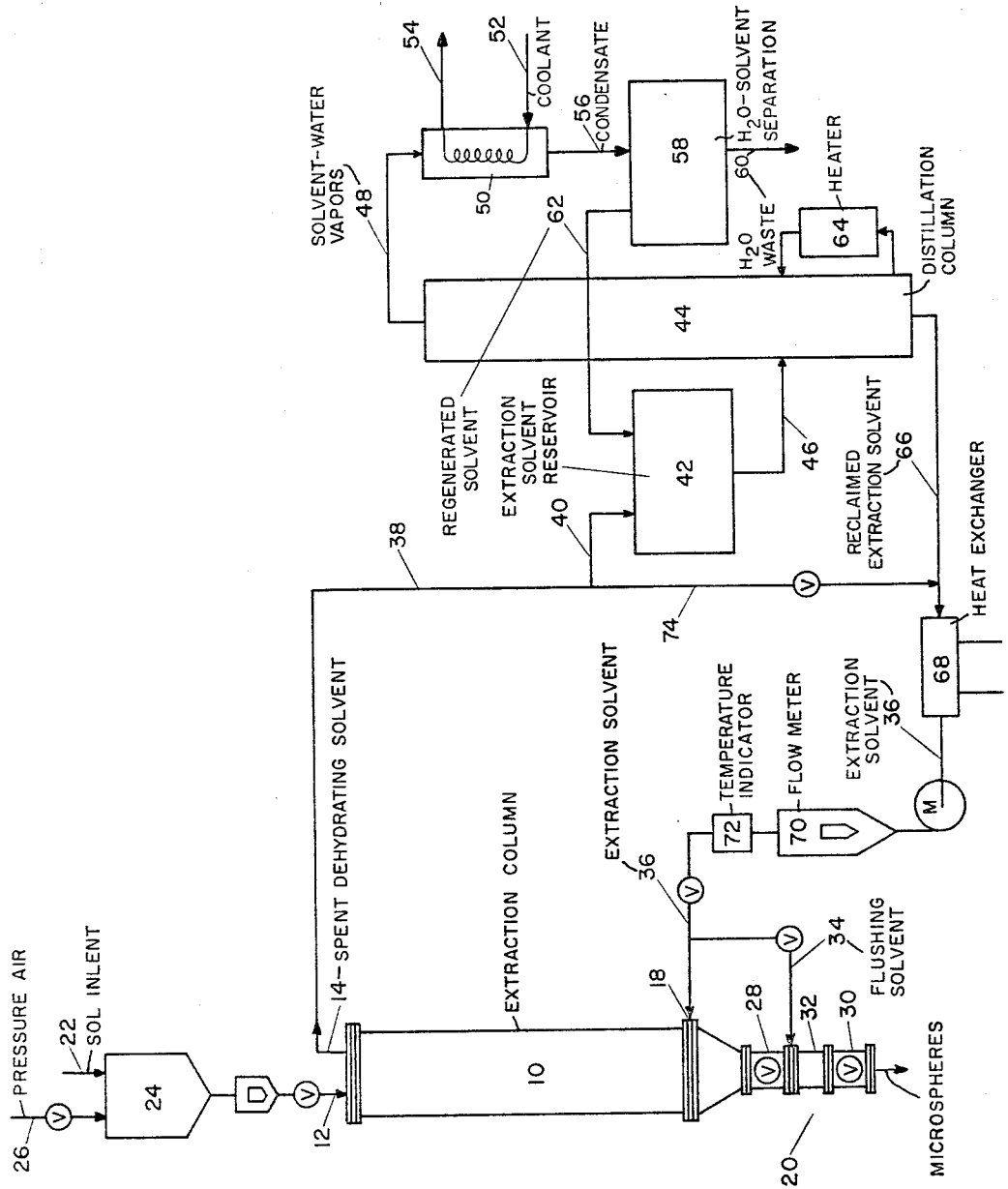

3,380,894
APPARATUS FOR CONVERTING HYDROSOLS
INTO SOLID MICROSPHERES
Herbert P. Flack, Ellicott City, and Jean Gillen Smith and Frederick T. Fitch, Baltimore, Md., assignors to W. R. Grace & Co., New York, N.Y., a corporation of Connecticut
Filed May 5, 1964, Ser. No. 364,930
3 Claims. (Cl. 202—169)

This invention relates to an apparatus for preparing spherical particles of controlled size formed of colloidal residues of hydrosols. This apparatus is particularly suitable for preparing dense spheres of nuclear materials such as urania, thoria, plutonia, and other actinide oxides, zirconium oxide, yttrium oxide, and systems containing actinide oxides in combination with other oxides and with carbon.

In summary, the apparatus of this invention comprises in combination, a vertical extraction column, an hydrosol introduction means communicating with the top of the column for introducing an hydrosol in the form of droplets into the top of the column, and solvent recovery means connected to the top and bottom of the column for removing dehydrating solvent from the top thereof, for removing sufficient water from the solvent to render it suitable for reuse, and for returning the reclaimed dehydrating solvent to the bottom of the column.

Actinide metal oxides have become of paramount importance in the field of nuclear fuels. Current reactor designs, especially the designs of the high temperature gas-cooled reactors, have placed very demanding requirements on the fuel employed. The fuel must be resistant to oxidation and fission product release. The fuel must be near theoretical density to provide the requisite efficiency. The fuel elements are usually formed by dispersing the fuel material in a ceramic matrix which is then pressed or compacted into the desired shape under high pressures, and the fuel material must be sufficiently strong to withstand the severe stresses present during compaction. Furthermore, the particles must be of uniform shape and size to effect a homogeneous concentration of fuel in the matrix.

Use of the fuel materials, actinide oxides and carbides, in the form of spherical particles met these stringent requirements. The spherical shape provided the requisite strength. Resistance to oxidation and fission product release was obtained by coating the spherical particles with a refractory metal, metal oxide, or pyrolytic graphite. However, great difficulty was encountered in obtaining uniform particle size, particularly since microspheres found suitable for this application were in the 50 to 200 micron diameter range.

The original technique developed to produce microspheres having a uniform size and shape was laborious, expensive, and had a very low yield. The product obtained lacked sphericity, uniform structure, regular surface, and the requisite strength. Ceramic powders were ground, compacted, crushed to the desired size, shaped into spheroids by abrasion techniques, and sintered to form the particles. At several stages in the process, the powder and particles were sized and the outsized particles were recycled. Generally, yields of less than 20 percent were obtained in each step, rendering the process very inefficient and expensive.

The apparatus of this invention provides an integrated, efficient system for producing microspheres from sol particles. This process involves the introduction of an hydrosol in the form of droplets, preferably having a uniform size, into the top of a column containing a dehydrating solvent capable of removing water from the sol droplets and drying same. The dehydrating solvent is introduced into the bottom of the column and removed from the top, and therefore the sol droplets fall countercurrent to the flow of the dehydrating solvent.

This process requires very carefully controlled conditions in the dehydrating column in order to provide effective drying of uniformly sized droplets to produce a dried spherical product having the requisite uniformity in size, composition, and surface, and to provide a dried product which has the requite strength after sintering. The column, in continuous operation, requires a constant supply of dehydrating solvent having a carefully controlled temperature and water content, both being critical features with respect to the rate of drying of the hydrosol droplets.

It is the object of this invention to provide an apparatus which will maintain a controlled dehydrating solvent environment in an extraction column for dehydration of hydrosol droplets to form dried microspheres having a uniform composition and surface and which have a high strength after sintering, and for dehydrating uniformly sized hydrosol droplets to form dried microspheres having a uniform size.

The figure is a diagrammatic view of the apparatus of this invention.

Referring to the figure, the extraction column 10 has a tapered bottom and is equipped with a sol introduction means 12 and a dehydration solvent outlet 14, and an extraction solvent inlet 18 above the tapered bottom at the lower end of the column and a spherical particle outlet 20 at the tapered bottom of the column. The sol introduction means 12 is connected to a sol dispensing means comprising sol reservoir 24, sol inlet means 22, and an air pressure supply means 26, whereby the sol in the reservoir 24 may be supplied under air pressure to the sol introduction means 12.

The sol can be introduced into the column in several ways. The sol can be injected directly into the top of the column through a hypodermic needle or other small tube and allowed to form droplets in the upflowing dehydrating solvent. The sol can also be injected, through a small tube, into a concurrently flowing stream of dehydrating solvent, allowed to form into droplets, and then can be introduced into the countercurrently flowing stream of dehydrating solvent as disclosed in copending application, Ser. No. 364,931, filed May 5, 1964. Alternatively, the sol can be emulsified to form a dispersion of sol droplets which are introduced into the top of the column 10. Any technique by which solid suspension droplets can be formed and/or introduced into the top of column 10 can be employed in the apparatus of this invention with such modifications as would be obvious to a person skilled in the art.

The spherical particle outlet 20 can comprise a first valve 28 connected to, and in communication with, the bottom of the column 10, a second valve 30 having an inlet and an outlet, and an intermediate chamber 32 communicating with the outlet of the first valve and the inlet of the second valve. Flushing fluid inlet conduit 34 is connected to the extraction solvent inlet conduit 36, and delivers purified solvent to the chamber 32 for flushing the spherical particles therefrom through the second valve 30.

Alternative systems, which do not require the use of a double valve and flushing line, can be employed to remove the dehydrated microspheres from column 10. The microspheres can be removed by suction or by means of an automatic discharge valve. However, the means chosen must not greatly disturb or disrupt the column operation and process conditions.

In the solvent recovery means, extraction solvent removed from the extraction solvent outlet 14 is delivered through conduit 38 connected therewith, and to the solvent inlet 40 connected therewith, and therethrough to the extraction solvent reservoir 42 of the distillation means. The water content of the solvent must be lowered to enable its reuse. Solvent from the reservoir 42 is transferred into the bottom of the distillation column 44 through connecting conduit 46 by gravity flow, pumping or other suitable means. In the column the water contained in the extraction solvent, together with a portion of the solvent, is vaporized and passes from the column through conduit 48 connected thereto to a condenser 50 having a cooling water inlet 52 and outlet 54. The condensate from condenser 50 then passes through connecting conduit 56 to the water-solvent separating tank 58. The water fraction is discharged to waste through conduit 60 and the separated solvent recycled from the separating tank 58 through connecting recycle conduit 62 to the solvent reservoir 42. The distillation column can be heated by passing a portion of the solvent through heater 64 communicating therewith and returning it to the bottom of the distillation column 44. The partially dewatered extraction solvent is taken from the bottom of the distillation column through conduit 66 for return to the extraction column 10. Other equivalent dewatering systems can be employed.

Other alternate arrangements of the solvent dewatering system can be employed. The solvent fraction from the separating tank 58 can be recycled directly to the distillation column 44, for example. Also, the solvent fraction from tank 58 can be added directly to line 66 in such proportions as to provide the desired water content in the solvent product. The heater 64 can be electrical, or in large systems can be a steam heater. Heat can also be added directly to the solvent in the column.

The water content of the solvent in the distillation column can be regulated by regulating the temperature of the solvent in the column. The column temperature can be raised, for example, by raising the temperature of heater 64 or by increasing the quantity of solvent cycled therethrough in large systems.

The dewatered solvent is passed through connecting conduit 66 to heat exchanger 68 for temperature control of the extraction solvent to be introduced into the extraction column 10. The solvent is then passed through conduit connection 36 having a flow meter 70, such as a rotometer, and a temperature measuring means 72, such as a thermometer or a thermocouple connected to a temperature indicating meter in the line thereof.

Bypass line 74 connects the solvent distribution line 38 and the dewatered solvent distribution line 66 for introducing controlled quantities of solvent containing a higher proportion of water whereby a predetermined water concentration in the purified solvent stream can be further regulated.

When the dehydrating solvent recovery system of this invention is employed with the sol introduction system disclosed in copending application Ser. No. 364,931 filed May 5, 1964, an additional by-pass line (not illustrated in the drawing) from conduit 36 to the sol introduction means can be provided with appropriate flow control, metering, and temperature control devices.

The system of this invention operates as follows:

By means of air presure from line 26, the sol is forced from reservoirs 24 at a controlled rate to the top of column 10 where it is introduced in the form of, or to form droplets. In column 10, the dehydrating solvent enters at inlet 18 and exits at outlet 14. The exiting solvent, which contains an undesired excess of water, is fed to reservoir 42 through conduits 38 and 40.

Solvent in reservoir 42 is continuously fed through line 46 into distillation column 44 where it is vaporized. The vapors are removed through conduit 48, are condensed by heat exchanger 50 and are fed to separator 58. The water fraction separating therefrom is discharged through conduit 60 and the solvent remaining in 58 is recycled to reservoir 42.

A portion of the solvent having a predetermined water content reflected by the boiling temperature of the liquid in the distillation column 44 is continuously removed therefrom for reuse. The reconditioned solvent is fed through line 66 to heat exchanger 68. Further control or variation of the water content of the reconditioned solvent can be obtained by introducing solvent from conduit 38, which has a high water content, into conduit 66 through conduit 74.

The solvent having the desired temperature is removed from heat exchanger 68 and is fed into the dehydration column through inlet 18. The rotometer 70 and temperature measuring device 72 aid in controlling the system.

If a double valve such as shown in the figure is employed in the system, a portion of the reclaimed solvent can be by-passed through line 34 to flush accumulations of microspheres through valve 30 during the discharge cycle.

The operation of the system of this invention is further illustrated by the following specific but non-limiting example.

Example I

This example shows a variety of conditions under which the apparatus of this invention can be operated to produce properly dehydrated microspheres. A $UO_2$ hydrosol and hexanol dehydrating solvent were employed. The sol was injected into hexanol through a small tube. The column was 3 inches in diameter and 7 feet in length.

| Run No. | Sol Flow Rate, cc./min. | Hexanol to Column | | | Distillation Pot Temp., ° C. |
|---|---|---|---|---|---|
| | | Flow Rate, cc./min. | Temperature, ° C. | Water Content, wt. percent | |
| 1 | 5.0 | 760 | 100 | 4.5 | 109 |
| 2 | 6.3 | 690 | 104.5 | 3.3 | 115 |
| 3 | 5.1 | 330 | 104.5 | 1.4 | 128 |
| 4 | 6.1 | 240 | 104.5 | 1.8 | 124 |
| 5 | 4.5 | 690 | 107 | 2.4 | 120 |
| 6 | 4.9 | 330 | 100.5 | 2.9 | 117 |

The apparatus of this invention provides a column environment capable of uniformly dehydrating uniformly sized sol droplets under controlled conditions to produce highly uniform miscrospheres which are far superior, both technically and economically, for use in the construction of nuclear reactor fuel elements. The system is capable of continuous, economical, and simple operation.

We claim:
1. An apparatus for making hydrosols into spherical solids comprising in combination,
    (a) a vertical extraction column having a tapered bottom,
    (b) an hydrosol introduction means communicating with the top of the column for introducing an hydrosol in the form of droplets into the top of the column, and
    (c) solvent recovery means connected to the top and bottom of the column for removing dehydrating solvent from the top thereof, for removing sufficient water from the solvent to render it suitable for reuse, and for returning the reclaimed dehydrating solvent to the bottom of the column, the solvent recovery means comprising
        (1) a first conduit means connected to the top of the extraction column for removing solvent therefrom,
        (2) a distillation means communicating with said first conduit means for removing from the solvent at least a portion of the water dissolved therein,
        (3) a second conduit means connected to the bottom of the extraction column above the tapered bottom and to the distillation means for returning reclaimed dehydrating solvent to the column,
        (4) a bypass conduit connecting said first and second conduits for introducing solvent removed from the extraction column and having a high water content into the reclaimed dehydrating solvent whereby the water content of the reclaimed dehydrating solvent is regulated, and (d) a spherical particle outlet means at the tapered bottom of the column.

2. The apparatus of claim 1 wherein the second conduit means comprises a heat exchanger means for regulating the temperature of the reclaimed dehydrating solvent.

3. An apparatus for making hydrosols into spherical solids comprising in combination, (a) a vertical extraction column having a tapered bottom, (b) an hydrosol introduction means communicating with the top of the column for introducing an hydrosol in the form of droplets into the top of the column, and (c) solvent recovery means connected to the top and bottom of the column for removing dehydrating solvent from the top thereof, for removing sufficient water from the solvent to render it suitable for reuse, and for returning the reclaimed dehydrating solvent to the bottom of the column, the solvent recovery means comprising (1) a first conduit means connected to the top of the extraction column for removing solvent therefrom, (2) a distillation means communicating with said first conduit means for removing from the solvent at least a portion of the water dissolved therein, the distillation means comprising (i) a solvent reservoir connected to said first conduit means for receipt of said solvent removed from the extraction column, (ii) a distillation column, (iii) conduit means connecting said solvent reservoir and distillation column for transferring solvent to the latter, (iv) vapor removal conduit means connected to the top of the distillation column for removal of the vapors therefrom and comprising a condenser means for condensing the vapors, (v) solvent-water separating means connected to the vapor removal conduit means for receipt of the condensed vapor and comprising means for removing solvent therefrom and means for discharging water therefrom, and (vi) solvent recycle means connecting the solvent-water separating means for returning the separated solvent to solvent entering the distillation column, (3) A second conduit means connected to the bottom of the extraction column above the tapered bottom and to the distillation means for returning reclaimed dehydrating solvent to the column, and (d) a spherical particle outlet means at the tapered bottom of the column.

References Cited

UNITED STATES PATENTS

| | | | |
|---|---|---|---|
| 2,148,460 | 2/1939 | Haney | 23—270.5 |
| 2,269,163 | 1/1942 | Othmer | 202—169 X |
| 2,562,783 | 7/1951 | Gallo et al. | 23—270.5 |
| 2,758,007 | 8/1956 | Ballard | 23—312 |
| 3,069,232 | 12/1962 | Greenberg et al. | 23—312 |
| 2,079,511 | 5/1937 | Klar et al. | 23—270 X |
| 2,508,002 | 5/1950 | Swenson | 23—270 X |
| 3,192,125 | 6/1965 | Sparks et al. | 23—270 X |
| 2,855,362 | 10/1958 | Ratje et al. | 196—14.52 X |
| 2,905,637 | 9/1959 | Scofield et al. | 196—14.52 X |
| 2,911,361 | 11/1959 | Kleiss | 196—14.52 X |

NORMAN YUDKOFF, *Primary Examiner.*

WILBUR L. BASCOMB, *Examiner.*

J. SOFER, *Assistant Examiner.*